Dec. 20, 1927.
S. J. WELTER
1,653,326
CHAIN PIPE VISE
Filed April 23, 1925
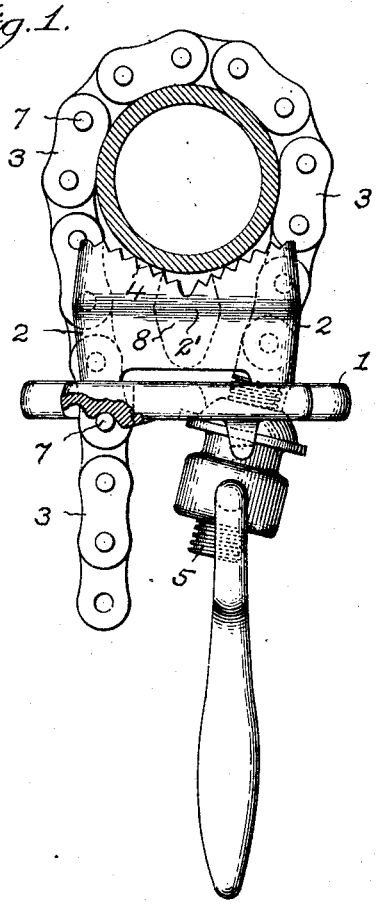
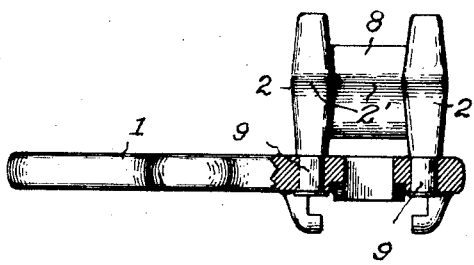
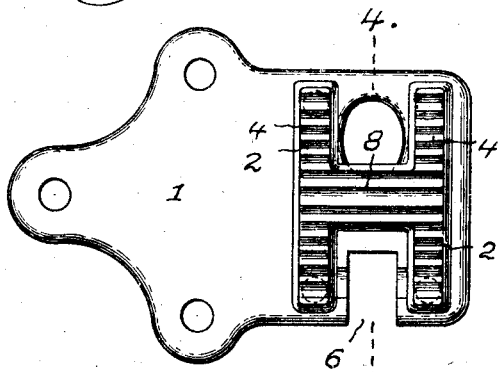
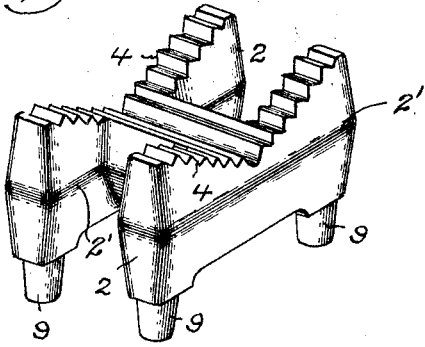
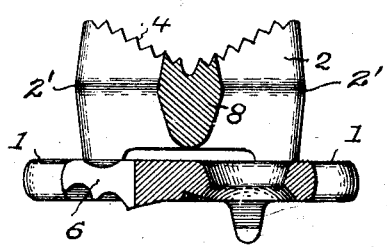
Inventor:
Sebastian J. Welter,
by Robert Burns
Atty.

Patented Dec. 20, 1927.

1,653,325

UNITED STATES PATENT OFFICE.

SEBASTIAN J. WELTER, OF CHICAGO, ILLINOIS, ASSIGNOR TO ARMSTRONG BROS. TOOL CO., OF CHICAGO, ILLINOIS, A CORPORATION OF ILLINOIS.

CHAIN PIPE VISE.

Application filed April 23, 1925. Serial No. 25,244.

This invention relates to that type of chain pipe vises in which a pair of upstanding channeled and serrated jaws are fixed in spaced relation to each other on a supporting base and are adapted for holding or gripping engagement with a section of pipe under the stress of a chain section encircling the crown of the pipe section, one end of which chain is adapted for fixed engagement with the supporting base and the other end connected to a take-up mechanism on said base, and by means of which a holding stress is imposed on said chain section. And the present improvement has for its object:

To provide a structural formation and integral connection of the counterpart and spaced holding jaws or anvils of the aforesaid type of pipe vises, by means of which an integral and rigid connection of the jaws or anvils is attained, and so that a unitary structure embracing both jaws or anvils can be drop forged from tool steel, capable of being hardened at proper points for continued and effective holding engagement with a section of pipe to be operated on, all as will hereinafter more fully appear.

In the accompanying drawing:

Fig. 1, is an end elevation of a pipe vise to which the present invention is applied.

Fig. 2, is a side elevation of same with the chain member and its take-up mechanism omitted.

Fig. 3, is a plan view of the same.

Fig. 4, is a transverse section on line 4—4, Fig. 3.

Fig. 5, is detail perspective view of the integrally connected holding jaws of the invention.

Like reference numerals indicate like parts in the several views.

The supporting base 1 of the vise is of the usual flat plate form adapted for fixed attachment to the top surface of a work bench or the like, and having means for the fixed attachment of a pair of upstanding jaws 2, in spaced relation to provide space for the reception and movement of the chain member 3 of the vise. The upper ends of the jaws 2 are formed with positioning channels preferably of the V shape shown, with such channels formed in turn with teeth or serrations 4 for effective holding engagement with the section of pipe operated on.

The chain member 3, is of the usual flat link type with one end attached to the movable member 5 of a take-up mechanism of any usual and suitable formation and which is attached on the wider face of the supporting base 1. From such take-up mechanism the chain 3 extends upward and over the crown portion of the section of pipe operated on, and then downward for locking engagement with the supporting base 1, usually by an open sided slot 6 in the base 1 into which any desired link of the chain may be inserted, with the lowermost pivot pin 7 of said chain link having projecting ends for stop engagement with the under margins of said slot. Such construction is usual to pipe vises of the present type and provides means for effecting the initial adjustment of the chain for engagement with different sizes of pipe sections to be operated on.

The material part of this invention in the present type of chain pipe vises, involves a construction in which the pair of separated holding jaws or anvils 2 are integrally connected together by a bridge piece 8 as a single unit on forging of steel, capable of subsequent hardening and tempering of the pipe holding surfaces of the jaws or anvils 2. In the preferred construction shown the upper edge or face of the central bridge piece 8 is on a plane with the upper faces or edges of the jaws 2 and formed with continuations of the serrations of said jaws as shown.

The integrally formed holding member of the vice, so far described is integrally formed with rivet studs 9 on its lower corners for entry and fixed engagement in complementary orifices in the supporting base 1. In the preferred form of the invention shown, both the holding jaws 2 and the connecting bridge piece 8 have a maximum thickness at their mid-height 2' and are tapered from such mid-height towards their upper and lower ends, with a view to attain a maximum degree of rigidity with a minimum amount of material and at the same time afford a single piece structure which can be readily and effectively produced by the drop forging method.

Having thus fully described my invention, what I claim and desire to secure by Letters Patent is:

1. A holding member for chain pipe vises formed as a unit of tool steel capable of hardening and tempering, the same comprising a pair of holding jaws in separated relation, and an integrally formed central bridge piece connecting said jaws together, the holding jaws and bridge piece having their greater thickness at their mid-height and tapering therefrom towards their upper and lower ends.

2. A holding member for chain pipe vises formed as a unit of tool steel capable of hardening and tempering, the same comprising a pair of holding jaws in separated relation, and an integrally formed central bridge piece connecting said jaws together, said bridge piece having serrations aligned with the serrations of the jaws, the holding jaws and bridge piece having their greater thickness at their mid-height and tapering therefrom towards their upper and lower ends.

3. A holding member for chain pipe vises, the same comprising a pair of holding jaws in separated relation, and an integrally formed central bridge piece connecting said jaws together, the holding jaws and bridge piece having their greater thickness at their mid-height and tapering therefrom towards their upper and lower ends.

4. A holding member for chain pipe vises, the same comprising a pair of holding jaws in separated relation, and an integrally formed central bridge piece connecting said jaws together, said bridge piece having serrations aligned with the serrations of the jaws, the holding jaws and bridge piece having their greater thickness at their mid-height and tapering therefrom towards their upper and lower ends.

Signed at Chicago, Illinois, this 21st day of April, 1925.

SEBASTIAN J. WELTER.